United States Patent [19]
Rehm

[11] 4,294,593
[45] Oct. 13, 1981

[54] DRILLING MUD DEGASSER APPARATUS AND SYSTEM

[76] Inventor: William A. Rehm, 1726 Augusta, Suite 113, Houston, Tex. 77057

[21] Appl. No.: 145,895

[22] Filed: May 2, 1980

[51] Int. Cl.³ .......................................... B01D 19/00
[52] U.S. Cl. ...................................... 55/166; 55/168; 55/177; 55/191; 55/207
[58] Field of Search .................................. 55/165–170, 55/177, 184, 191–193, 204, 207

[56] References Cited

U.S. PATENT DOCUMENTS

| | | | |
|---|---|---|---|
| 1,515,126 | 11/1924 | Lennox | 55/184 X |
| 2,064,650 | 12/1936 | Emanueli | 55/165 |
| 2,195,898 | 4/1940 | Newton | 55/170 |
| 2,748,884 | 6/1956 | Erwin | 55/193 |
| 3,201,919 | 8/1965 | Long | 55/204 X |
| 3,241,295 | 3/1966 | Griffin et al. | 55/165 |
| 3,362,136 | 1/1968 | Burnham, Sr. et al. | 55/191 X |
| 3,517,487 | 6/1970 | Burnham, Sr. | 55/192 |
| 3,895,927 | 7/1975 | Bournham, Sr. | 55/170 |
| 3,898,061 | 8/1975 | Brunato | 55/193 |
| 4,010,012 | 3/1977 | Griffin et al. | 55/169 |

Primary Examiner—Robert H. Spitzer
Attorney, Agent, or Firm—Neal J. Mosely

[57] ABSTRACT

A drilling mud degasser apparatus and system consists of a vacuum degasser tank, system of blowers or compressors for evacuation, and various control features associated therewith. The tank has an upward spiraling helical shelf which becomes progressively wider from bottom to top so that mud is discharged in a thin film into the evacuated interior of the tank. Mud level in the tank is controlled by a pair of float operated valves, one controlling a bottom discharge and the other controlling an overflow valve. A plurality of compressors are connected in parallel for evacuating the tank. One compressor runs continually and the others are turned on in response to tank pressure and off in response to compressor outlet temperature. A safety conduit is positioned in parallel to the compressors and includes a swing check valve which opens in response to a pressure surge in the tank to permit the increased pressure to bypass the compressors. The overflow-controlling valve is protected against mud contamination by an inverted U-tube. Mud is normally removed from the bottom discharge under suction provided by mud flowing through an aspirator nozzle.

15 Claims, 7 Drawing Figures

DRILLING MUD DEGASSER APPARATUS AND SYSTEM

BACKGROUND OF THE INVENTION

1. Field of the Invention

This invention relates to new and useful improvements in systems and apparatus for removing gas from drilling mud.

It is particularly concerned with a system including a vacuum tank of improved construction for removing poisonous, explosive gas entrained in drilling mud, and is further concerned with apparatus and control features associated with such a system.

2. Brief Description of the Prior Art

In drilling oil wells, it has long been standard practice to use drilling muds for the purpose of cooling and lubricating the drill bit, removing cuttings from the hole, lubricating the drill pipe, providing cake or seal lining for an exposed formation hole, and as a controllable hydraulic head or load for prevention of premature flowing of the well. Drilling muds are made heavier by addition of pulverized barites or barium sulfates.

As the hole goes deeper, greater earth rock pressures are encountered and thus greater oil or gas pressures when petroleum strata are reached. It is standard practice to carry surplus weight in the drilling mud as a safety factor for anticipation of abnormal gas pressures. As the hole deepens, the density of the mud is often increased to provide an added safety factor. An ideal system would be one where the mud is just heavy enough to suppress fluid flows from the formation being drilled, with only enough additional weight to offset the lightening effect of gases released from the formation. If the drilling mud is much heavier than the formation pressures encountered, then a serious hazard of mud loss to the formation arises. As a result, the driller can not just add a large surplus of weighting materials to his mud in order to prevent formation flows while drilling. If the mud is too light, hydrocarbons or salt water may flow from the formation and blow the mud column from the hole. If the mud is too heavy, it may break down a formation and flow into it instead of circulating back to the surface.

As drilling progresses, gases are picked up by the circulating mud. These gases may be petroleum gases or hydrogen sulfide or inert gases, such as, nitrogen or helium. The gases may be present initially as liquids under the pressures encountered at the drill bit, but as the mud rises to the top of the well with steadily decreasing pressure on it, these liquids turn into gases and expand and lighten the mud with the dissolved gases or gas bubbles formed in it. If the dissolved gases or gas bubbles are not removed and the mud recirculated, it picks up still more gas, making the mud even lighter, necessitating the addition of even greater amounts of weighting materials. Thus, the thorough removal of entrained and dissolved gases and lighter liquid hydrocarbons from the drilling mud is quite important in drilling oil or gas wells.

In the past, many techniques have been used for removal of gases from drilling muds. In earlier times, drilling muds were simply flowed through long troughs or ditches and were agitated by some means to facilitate removal gas. Many different types of apparatus have been designed for removal of gases from drilling muds but most have been discarded for one reason or another, usually a matter of economy or efficiency.

Erwin U.S. Pat. No. 2,748,884 discloses an apparatus for continuously degassing drilling mud including a degassing vacuum tank and jet nozzles for circulating the drilling mud.

Long U.S. Pat. No. 3,201,919 discloses a drilling mud degasser apparatus in which drilling mud is circulated into a vacuum tank along a helical path and withdrawn and recirculated into the well.

Griffin U.S. Pat. No. 3,241,295 discloses a drilling mud degasser having various valves and controls for controlling the rate of mud flow into a degassing tank.

Burnham U.S. Pat. No. 3,362,136 discloses a degasser apparatus for drilling muds in which the drilling mud moves on a helical shelf downward into a vacuum tank.

Bournham U.S. Pat. No. 3,895,927 discloses a drilling mud degasser apparatus having baffle plates in a vacuum tank over which thin films of mud are degassed.

Brunato U.S. Pat. No. 3,898,061 discloses a degasser apparatus which breaks up the mud-gas emulsion by a combination of mechanical action and vacuum and disposes of the separated gas at a location remote from the working area.

Griffin U.S. Pat. No. 4,010,012 discloses a drilling mud degasser system which removes gas from drilling mud without allowing it to escape to the atmosphere before the gas is treated to prevent contamination. The drilling mud flows downward into a vacuum degassing tank and gases removed overhead and degassed mud is removed from the bottom of the degasser tank.

SUMMARY OF THE INVENTION

A drilling mud degasser system comprises a vacuum tank having an inlet for drilling mud with an overhead outlet for removal of gas and a bottom outlet for removal of degassed mud. The tank is connected to a plurality of compressors or blowers which are connected to the overhead tank outlet for evacuating the same to remove gas from the drilling mud. Vacuum switches operate the blowers succesively as required by the pressure, i.e. vacuum, in the tank. One of the blowers or compressors runs continuously even under "deadhead" conditions. The other blowers are activated as needed when additional gas enters the system with the drilling mud. The additional blowers are turned off whenever they become overheated. The control of these blowers is effective by thermostatic switches responsive to gas temperature on the outlet sides of the blowers. The system includes a bypass conduit connected to the overhead outlet from the vacuum tank. The bypass conduit is connected in parallel to the blowers and is normally closed by a pressure responsive or flow responsive valve, such as a swing check valve, and, when the valve is opened by a pressure surge, the additional pressure is dumped through the bypass conduit to avoid overloading the blowers that are used for evacuating the degasser tank. In the degasser tank, there is provided an upwardly spiraling helical shelf which becomes progressively wider along its upward length. Mud enters the tank under the influence of a circulating pump at the lower end of the helical shelf and is pumped upward along that shelf where it overflows in falling film into the tank and is degassed by the low pressure, i.e. vacuum, in the tank. Float operated valves control the level of mud in the tank and control this level by controlling a bottom tank valve and a valve for removal of the mud through an overflow line. Mud removed from the bottom of the tank is sucked out under the influence of an aspirator or jet nozzle.

DESCRIPTION OF THE PREFERRED EMBODIMENTS

Figure 2:
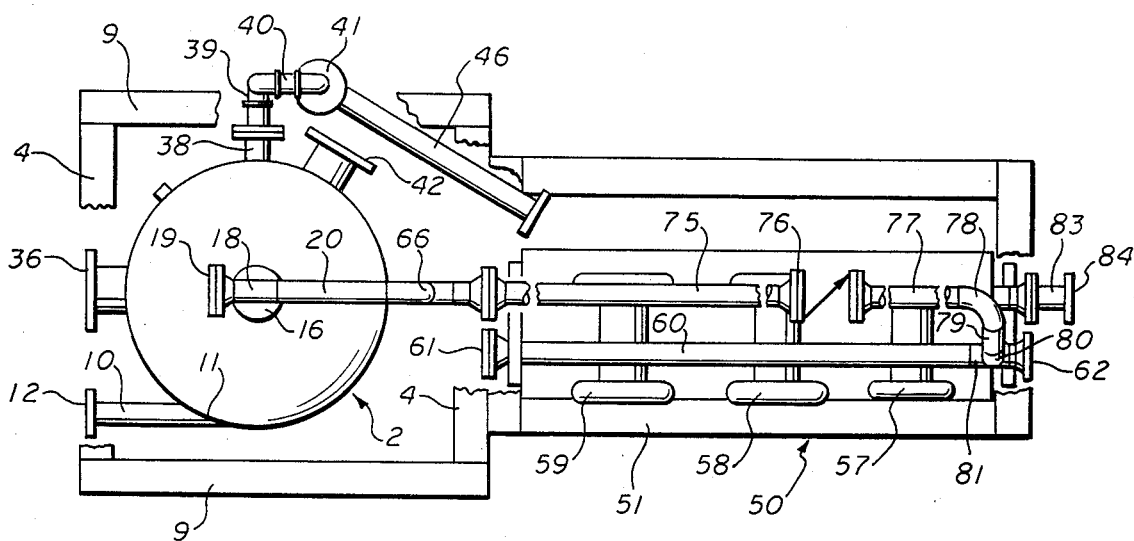
FIG. 2 is a plan view of the system and apparatus shown in FIG. 1.

In the various figures of the drawings there is shown a drilling mud degasser apparatus and system which is designed to take drilling mud from the choke line, degas the mud, and send the gas to the flare line and the degassed mud to the pits. All of this is accomplished as a closed system without ever exposing the gas laden mud to the atmosphere. The system is particularly suited to conditions where hydrogen sulfide may be present or where it is particularly advantageous to prevent any gas from being released in the drilling rig area. The apparatus is designed for operation over a wide range of operating conditions and can be scaled up or down in size to fit particular desired operating conditions.

The apparatus and system consists of three related portions, viz. the degasser or separator tank and associated equipment and controls, the plurality of compressors or blowers which control the evacuation of the degasser tank and associated control features, and a control panel which contains remote controls for turning the system off and on and which includes monitoring gauges and signal lights.

Referring to the drawings by numerals of reference and more particularly to FIGS. 1 to 4, there is shown a drilling mud degasser apparatus and system having a degasser unit 1 comprising a vertically oriented tank 2 supported on a supporting skid 3. Supporting skid 3 is preferably formed of angle iron or I-beam or H-beam construction, the components of which are welded together as indicated. Supporting skid 3 includes base portion 4, vertically extending supports 5 and 6 and supporting legs 7 and 8 for tank 2. Vertical supports 5 and 6 are welded to base 4 and are secured together at the top by horizontally extending beam 9. A similarly numbered set of vertical supports and the like are provided at the back of the base portion 4 of skid 3.

Figure 4:
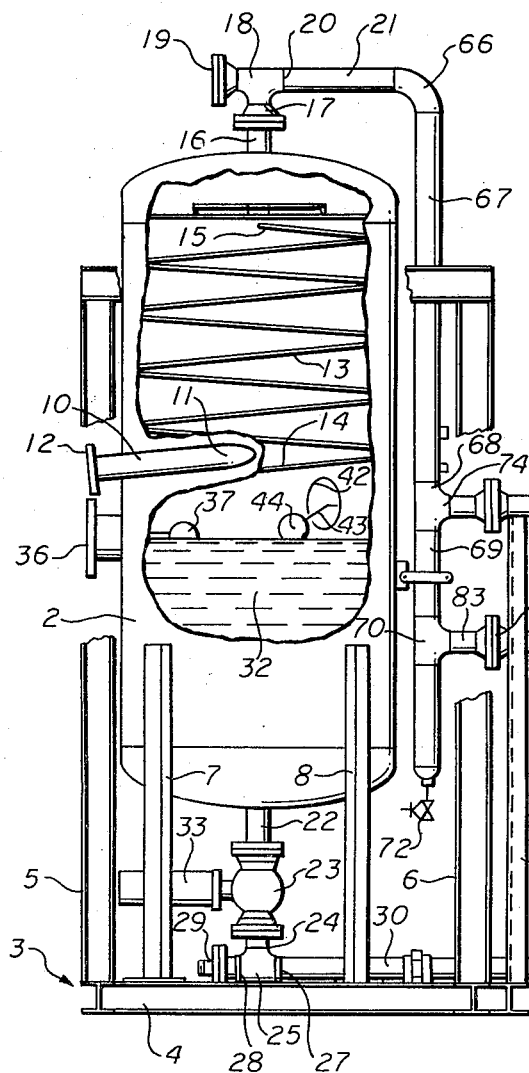
FIG. 4 is a view in elevation of the degasser system and apparatus as shown in FIG. 1 with the degasser tank shown partially in section.
Figure 5:
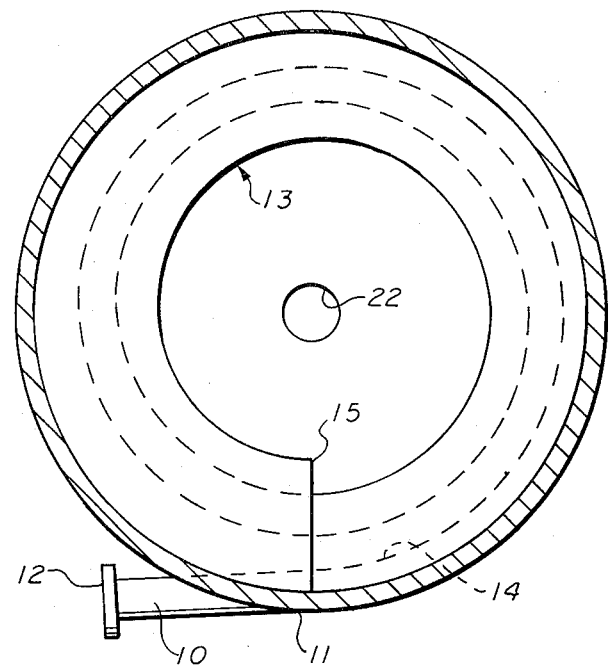
FIG. 5 is a sectional view on the line 5—5 of FIG. 1 showing the helical shelf used in the degasser tank.

Tank 2 has an inlet conduit 10 which enters tangentially as indicated at 11 and has a connecting flange 12 at its outer end. Inside tank 2, as shown in FIG. 4, there is a helical shelf 13 which spirals upwardly within the tank and has its bottom end 14 adjacent to tangential inlet opening 11 and its top end terminating at 15 adjacent to the top of the tank. Helical shelf 13 is also shown in plan view in FIG. 5. Helical shelf 13 is relatively narrow at its lower end 14, as seen in FIG. 5, and tapers gradually outward along its helical upward length and terminates at its upper end 15 as a relatively wide shelf. As will be described more fully hereafter, the tapering helical shelf 13 is arranged to conduct gas-containing mud upward along its helical length with the mud spilling over in a thin sheet or film for removal of gas in the evacuated space within the tank. The shelf 13 tapers gradually outward so that as the mud moves upward along the shelf it falls over the edge in a falling sheet or film without contacting or interfering with the mud falling from lower lying coils of the helix.

The top of tank 2 is provided with a flanged outlet conduit 16 which connects to one side 17 of a T-fitting 18. One side 19 of T-fitting 18 is closed and the other side 20 is connected to conduit 21 which is connected in turn to a conduit system leading to a series of compressors or blowers which will be described more fully hereinafter and which are operable to evacuate tank 2 for degassing the drilling mud therein.

Figure 6:
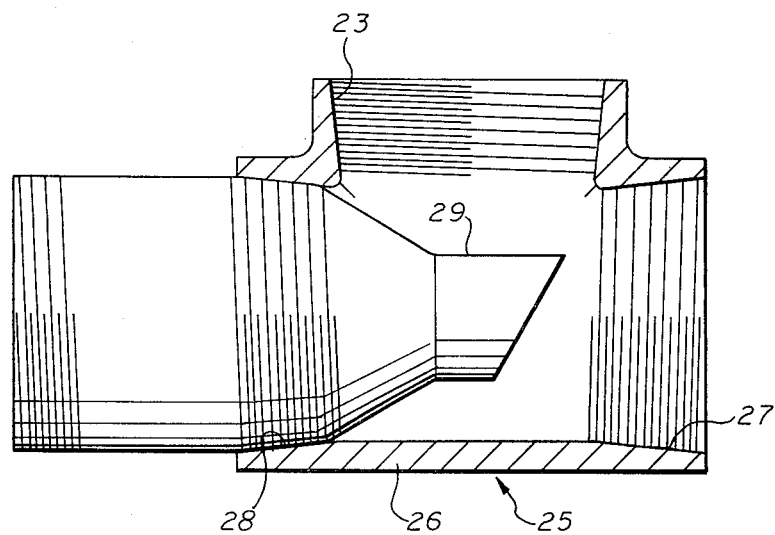
FIG. 6 is a detail view in section of one of the aspirator jets used for assisting in the withdrawal of degassed mud from the bottom of the degasser tank.

The bottom of tank 2 has a flanged outlet conduit 22 connected to one side of control valve 23, the other side of which is connected to one side opening 24 of aspirator 25, the details of which are shown in FIG. 6. Aspirator 25 has a T-shaped body portion 26 with side opening 23 and longitudinal openings 27 and 28. A nozzle or jet 29 is threadedly secured in opening 28 of aspirator 25 and is connected by flanged connector 29 to a conduit, not shown, through which mud is pumped to create a suction in aspirator 25 for assisting in the withdrawal of drilling mud from the bottom of degasser tank 2. Side outlet 27 of aspirator 25 is connected to conduits 30 and 31 which form the outlet for discharge of mud to the mud pit.

Figure 7:
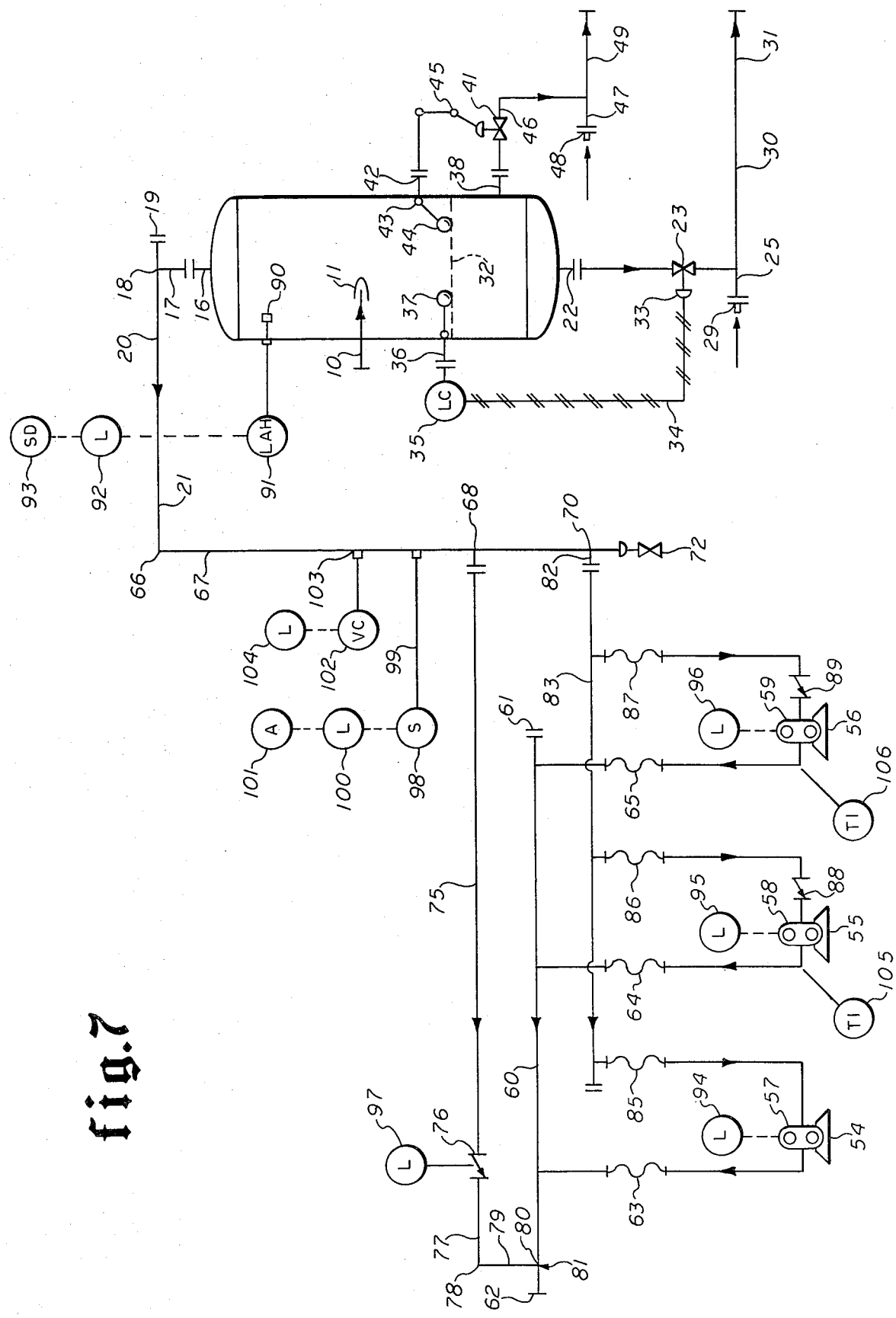
FIG. 7 is a schematic view showing the connection of the evacuating blowers and the various control features and indicators used in connection with the degasser tank and associated apparatus.

Valve 23 controls the level of mud 32 in mud degasser tank 2, as shown in FIG. 4. Valve 23 is an air controlled valve having a pneumatic controller 33 which is connected by air line 34, as shown in FIG. 7, to level controller 35 which is secured on flanged opening 36. A float 37 is secured inside tank 2 and connected to operate level controller 35 through flanged opening 36. Float 37 is operable to open valve 23 when the level of mud 32 reaches a predetermined point. If the mud level drops, float 37 is operable to close valve 23 to allow the mud level to rise again.

Mud degasser tank 2 is provided with a flanged outlet opening 38 which provides an emergency overflow from the tank in the event of failure of the control system for the bottom outlet. Outlet opening 38 is connected to elbow 39, which is connected to inverted U-tube 40 which is connected to one side of overflow control valve 41. Degasser tank 2 is also provided with a flanged outlet opening 42 through which there is connected a mechanical linkage 43 from control float 44. Linkage 43 is physically connected as at 45 to overflow control valve 41. Upon failure of the bottom control valve 23 to function, float 44 operates through mechanical linkage 43 and connection 45 to open valve 41 and permit mud to drain through outlet opening 38. The outlet side of control valve 41 is connected by overflow conduit 46 to aspirator 47, shown schematically in FIG. 7. Aspirator 47 is constructed indentically to aspirator 25 and is provided with circulating drilling mud through conduit 48. Drilling mud flowing through aspirator 47 keeps overflow conduit 46 under suction so that when overflow control valve 41 is opened drilling mud will be sucked out of outlet opening 38 to prevent an excessive level of drilling mud from developing in degasser tank 2. Outlet conduit 49 discharges to the mud pit in the same manner as bottom outlet conduits 30 and 31. Inverted U-tube 40 which is connected from overflow outlet 38 functions to keep opening 38 under a positive liquid seal and prevents mud, and particularly the barites or other weighting components, from settling out on control valve 41.

Figure 1:
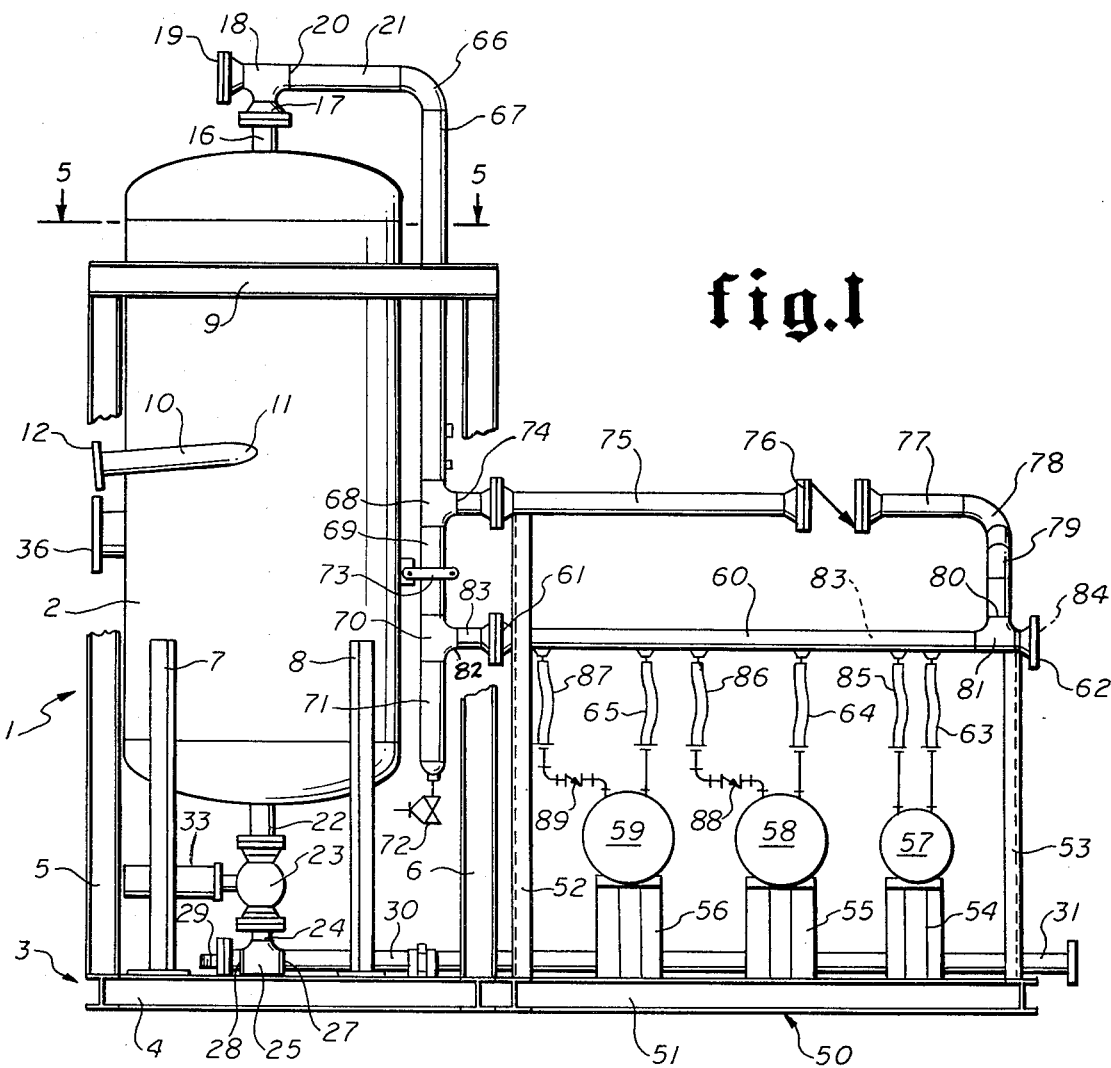
FIG. 1 is a view in elevation, partially schematic, of a drilling mud degasser apparatus and system representing a preferred embodiment of this invention.
Figure 3:
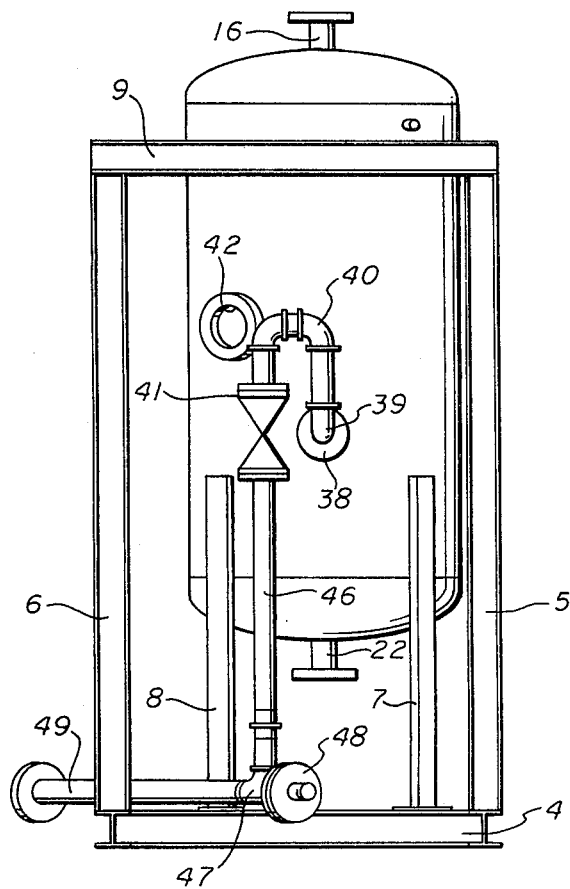
FIG. 3 is a view in elevation as seen from the backside of the degasser tank shown in FIG. 1.

The top outlet opening from degasser tank 2 is connected through pipes or conduits to a system of blowers shown at the right end of FIGS. 1, 2 and 4 and shown to the left side of schematic diagram, FIG. 7. The blower or compressor unit comprises a supporting skid 50 consisting of a base portion 51 formed of angle iron, I-beams or H-beams of welded construction and vertically extending support members 52 and 53. The base 51 of supporting skid 50 supports the bases 54, 55 and 56 for blowers or compressors 57, 58 and 59 which are connected to evacuate degasser tank 2. The system is provided with an outlet conduit 60 which is closed at one end as indicated at 61 and open at end 62 for discharge to a gas procressing system, such as a gas flare. Outlet conduit 60 is connected by flexible conduits 63, 64 and 65 leading from the outlet sides of compressors 57, 58 and 59, respectively. The inlet sides of the respective compressors are connected to a conduit system as will be subsequently described.

Conduit 21 leading from T-connector at the top of degasser tank 2 is connected to elbow 66 which in turn is connected to downwardly extending conduit 67 connected to one side of T-connector 68. The other side of T-connector 68 is connected to conduit 69 which leads to one side of T-connector 70 the other side of which is connected to conduit 71 leading to drain valve 72. The system of conduits 67, 69 and 71 is supported on degasser tank 2 by supporting bracket 73. The side outlet 74 of T-connector 68 is connected to conduit 75, which in turn is connected to one side of a pressure or flow responsive valve 76. Valve 76 is preferably a swing check valve which opens on flow of gas from left to right as indicated by the arrow in the valve. The outlet side of swing check valve 76 is connected by conduit 77, elbow 78 and conduit 79 leading to a side inlet 80 to T-connector 81 at the outlet end 62 of conduit 60. The system of conduits 75, 77 and 79 and swing check valve 76 is therefore connected parallel to conduit 60 on the outlet sides of compressors or blowers 57, 58 and 59 is operable to bypass the blowers in the event of a pressure surge in degasser tank 2.

The side outlet 82 from T-connector 70 is connected to conduit 83 which is closed at its outer extremity 84. Conduit 83, in turn, is connected by flexible conduits 85, 86 and 87 to the inlet side of blowers or compressors 57, 58 and 59, respectively. Conduits 85, 86 and 87 have swing check valves 88 and 89 therein which prevent back flow through blowers or compressors 57, 58 and 59, respectively.

The system and apparatus is provided with a series of indicators and controls which are shown in FIG. 7 and which are mostly located on the control panel which is positioned on the floor of the drilling rig. Degasser tank 2 is provided with a high level float 90 which operates the high level alarm 91 which is connected to a danger signal light 92 and an emergency shut down control switch 93. The control panel is provided with a number of signal lights which indicate the operation or nonoperation of various components of the system. Signal lights 94, 95 and 96 are energized in response to operation of blowers or compressors 57, 58 and 59, respectively. Signal light 97 is operated in response to swing check valve 76 and indicates whether that valve is open or closed. The hydrogen sulfide detector 98 is connected as indicated at 99 to conduit 67 to sense the presence of hydrogen sulfide in the gases withdrawn from degasser tank 2. Hydrogen sulfide detector 98 operates signal light 100 to indicate the presence of hydrogen sulfide and also operates alarm signal 101 when the hydrogen sulfide content exceeds a safe limit. A vacuum controller 102 is connected as indicated at 103 to conduit 67 leading from degasser tank 2 and is operatively connected to compressors or blowers 95 and 96, respectively, to energize the same in response to the amount of vacuum provided in degasser tank 2. Vacuum controller 102 is also connected to signal light 104 which indicates a desired level of vacuum when the green light is energized and indicates an unsafe high pressure by the energization of a red alarm light.

OPERATION

The operation of this apparatus and system should be apparent from the foregoing description of the component parts and the manner of assembly. Nevertheless, a more thorough description of operation will be given to facilitate a thorough understanding of the characteristics and capability of the apparatus and system.

This mud vacuum recovery system takes drilling mud from the choke line, degases it and sends the gas to the flare line and the mud to the pits. This is accomplished as a closed system without ever exposing gas laden mud to the atmosphere. This system is particularly suited to conditions where hydrogen sulfide may be present or where it is particularly advantageous to prevent any gas from being released in the drilling rig area. The system is designed to operate over a range from 0 to 1,000 gallons per minute of mud in combination with 0 to 2,000 cubic feet per minute of gas. The operating range can be extended to twice these values for short intervals and still maintain complete control of the system. Obviously, by suitable redesign, the system could be made to accommodate larger or smaller amounts of mud and gas.

In the operation of the system, drilling mud, containing a substantial amount of gas, is pumped into degasser tank 2 through inlet conduit 10 at the tangential inlet 11. The drilling mud flows upward along helical shelf 13 which becomes progressively wider from the lower end 14 to the upper end 15. The drilling mud spills over the edge of shelf 13 in a falling sheet or film which facilitates the removal of gases from the mud by the low pressure or vacuum maintained inside the tank. The drilling mud collects in the bottom of the tank as indicated at 32 where the liquid level is controlled by floats 37 and 44. Float 37 controls valve 23 to permit the removal of mud through outlet conduit 22 at the bottom of tank 2. Valve 23, as described above, is a pneumatically controlled valve operated by pneumatic controller 35 and air line 34 leading to the pneumatic operator 33 on the valve. When the liquid level 32 reaches a predetermined upward limit, float 37 is operable to cause valve 23 to open to permit drilling mud 32 to be removed through bottom outlet 22. The aspirator 25 connected in the bottom of valve 23 provides a suction on the outlet end of valve 23 to facilitate removal of mud 32 through the outlet opening 22. The drilling mud 32 which is removed from the bottom of degasser tank 2 is mud which has been degassed by being subjected to vacuum in tank 2 while falling as a sheet or film off the edges of helical shelf 13. The drilling mud 32 which is removed through bottom outlet 22 and valve 23 is discharged through lines 30 and 31 to a mud pit. In the event of a failure in operation of control valve 23, or in the event of an excessive input of drilling mud, for any reason, the level of drilling mud 32 may rise to a higher level and cause float 44 to actuate mechanical linkage 43 to operate overflow valve 41 which permits drilling mud to flow out through outlet opening 39 and control valve 41. Drilling mud flows from outlet 39 through the inverted U-tube 40 and valve 41 to aspirator 47 and conduit 49 leading to the mud pits. The U-tube 40 maintains a liquid seal at outlet 39 while preventing drilling mud from settling out on control valve 41.

The vacuum in degasser tank 2 is maintained by operation of the compressors or blowers 57, 58 and 59, respectively. These blowers pump gas out of degasser tank 2 and maintain the desired level of vacuum therein. Degasser tank 2 is designed as a vacuum vessel with the vacuum not to exceed 10 psi and the positive pressure never to exceed 35 psia.

When the system is initially energized, blower 57 operates continuously. Blower 57 is preferably a Rotron DR 5 compressor or blower operated with a 3 HP explosion proof motor. This compressor runs continuously and, in the absence of gas from the well, the compressor pulls a deadhead vacuum of 7" Hg. as gas flow from the well increases to a level of 100–150 cfm, the vacuum level in degasser tank 2 will decrease to 5" Hg. which causes vacuum controller 102 to energize blower or compressor 58. This compressor is preferably a Rotron DR 8 using a 10 HP explosion proof motor. This blower is capable of pulling a vacuum of 7 to 9 inches Hg. If the vacuum in degasser tank 2 continues to drop, the third compressor, i.e. compressor 59 is energized by action of vacuum controller 102. Blower 59 is of the same type as blower 58 and is capable of pulling a vacuum of 7 to 9 inches Hg. As noted above, blower 57 is designed to run continuously under deadhead conditions without over heating. Compressors 58 and 59 are turned on successively, as described above, by operation of vacuum controller 102 as required by the level of vacuum in degasser tank 2. The swing check valves 88 and 89 on the inlet side of compressors 58 and 59 prevent backflow of gas through the compressors when those compressors are not operating. Compressors 58 and 59 are energized by action of vacuum controller 102 and are deenergized by thermostatic switches 105 and 106 which are located in the outlet lines from those compressors. The compressors 58 and 59 are therefore turned on by vacuum controller 102 but are turned off by an overload condition which would result in over heating and activation of thermostatic switches 105 and 106.

In the event that a peak surge of gas occurs in degasser tank 2, such a gas surge could overload and damage the compressors were it not for the bypass system which is provided. In the event of a pressure surge, swing check valve 76 in bypass conduit 75 will open with 6 lbs. force or a differential pressure of 0.5 psi. The bypass system normally operates only in the absence of mud flow which is a maximum, worst case condition for gas volume. When the pressure surge occurs, swing check valve 76 is opened and the excessive amount of gas bypasses all three of the compressors and is passed directly out through outlet conduit 60 leading to the flare or other gas discharge point. As soon as the gas pressure drops back to a level capable of being handled by the compressors, swing check valve 76 closes and the compressors begin to operate to reduce the pressure in tank 2 to a level of vacuum required for degassing the mud circulating therethrough.

This apparatus and system is designed with a maximum of safety features. The bottom outlet from degasser tank 2 is controlled by a ball and arm float which operates through an air controller to a modified ball valve 23. The mud is removed from the bottom of the tank through bottom suction as previously described. The secondary overflow for mud is provided as a separate system employing its own independent discharge line and aspirator or suction jet. A direct linkage ball float 44 and arm 43 operate a butterfly valve 41. As previously described, the inverted U-tube 40 prevents mud from settling out on valve 41. High level alarm float 90 operates high level arm 91 to warn that the tank 2 is filled with mud and that the well should be closed in.

The system is built to avoid the hazards of gas release from the choke line or flow line. The system is uniquely designed for the problems brought about by hydrogen sulfide. To avoid leaks, the vacuum system employed insures that all leaks are inward. The large explosive envelope of hydrogen sulfide is avoided by the use of a deadhead system with no circulation of air into the separator tank. Blower or compressor 57 operates continuously under deadhead conditions to maintain tank 2 at a desired low pressure during start up. The compressors are limited so that the conditions for diesel type explosions are avoided. Compressors 58 and 59 are energized in sequence as required by vacuum conditions in tank 2 as determined by vacuum controller 102. The gas bypass system, i.e. bypass conduit 75, provides for a fail safe gas volume disposal in the event of a pressure surge in degasser tank 2. The various signal lights and alarms which are provided permit the operator to know the status of the system at all times. The apparatus and system described is an effective degassing system that can be used either on the choke line or from the shaker tank.

While this invention has been described fully and completely with special emphasis upon a single preferred embodiment having a variety of special design features, it should be understood that within the scope of the appended claims this invention may be practiced otherwise than as specifically described and shown herein.

I claim:
1. A drilling mud degasser system comprising
a tank having an inlet for drilling mud and an overhead outlet for removal of gas and a bottom outlet for removal of degassed mud,
a plurality of blowers operatively connected to said overhead outlet for evacuating the same to remove gas from drilling mud therein,
pressure operated switch means operable to energize said blowers successively upon occurence of a predetermined pressure on the inlet side of said blowers, and
thermostatic switch means responsive to gas temperature on the outlet sides of said blowers and operable upon occurence of a predetermined temperature to deenergize at least one of said blowers.
2. A drilling mud degasser system according to claim 1 in which one of said blowers is operable to run continually, independently of said pressure operated switch means and said thermostatic switch means.

3. A drilling mud degasser system according to claim 1 in which
said pressure operated switch means comprises a plurality of switches operable to energize predetermined blowers at different predetermined ones of said pressures.

4. A drilling mud degasser system according to claim 1 including
a conduit connected in parallel to said blowers and operatively connected to said overhead outlet and including a pressure responsive valve, normally closed, and operable upon occurence of a predetermined high pressure to open and permit flow of gas bypassing said blowers.

5. A drilling mud degasser system according to claim 4 in which
said pressure responsive valve is a swing check valve.

6. A drilling mud degasser system according to claim 1 in which
said tank includes float operated valve means controlling the flow of drilling mud from said bottom outlet.

7. A drilling mud degasser system according to claim 6 in which
said float operated valve means is opened upon occurence of a predetermined level of mud in said tank.

8. A drilling mud degasser system according to claim 7 in which
said float operated valve means includes an air pressure operated valve controlling said bottom outlet and a float operated air control valve operated in response to the level of mud in said tank.

9. A drilling mud degasser system according to claim 6 including
an overflow outlet in said tank for removal of degassed mud therefrom, and
float operated valve means in said tank opened upon occurence of a predetermined high level of mud to permit flow of mud therethrough.

10. A drilling mud degasser system according to claim 9 including
an inverted U-tube connected to said overflow outlet, extending above the level of said outlet, and connected to said float operated valve means at a level below said outlet to prevent settling of mud weighting components therein.

11. A drilling mud degasser system according to claim 6 including
suction means connected below said float operated valve means to assist in withdrawing mud from said tank.

12. A drilling mud degasser system according to claim 11 in which
said suction means comprises an aspirator nozzle having a suction inlet connected to said float operated valve means and inlet and outlet openings for circulation of mud by a mud pump to produce a suction at said suction inlet for removing mud from said tank.

13. A drilling mud degasser system according to claim 1 in which
said tank includes a helical shelf spiralling vertically along the inside of the wall of said tank and operable to discharge mud therefrom in a falling sheeet to facilitate removal of gas therefrom,
said helical shelf having a bottom end positioned adjacent to said mud inlet to receive mud entering therethrough so that mud flows up along said shelf in a helical path and overflows therefrom in a falling sheet.

14. A drilling mud degasser system according to claim 13 in which
said helical shelf is narrow at its bottom end and becomes progressively wider along the helical length thereof.

15. A drilling mud degasser tank comprising
a hollow enclosed tank having
a side inlet for receiving drilling mud,
a top outlet for removal of gas, and
a bottom outlet for removal of degassed drilling mud,
a helical shelf supported inside the wall of said tank having the bottom end thereof adjacent to said side inlet to receive drilling mud thereon and spiralling upward along the tank wall so that mud moving along said shelf may fall as a thin sheet or film into the interior of the tank, thus facilitating removal of gas therefrom, and
said helical shelf narrower at its bottom end than at its top end and tapering outward from bottom to top along its helical length.

* * * * *